United States Patent [19]

Ketelaar

[11] 3,823,340

[45] July 9, 1974

[54] CIRCUIT FOR GENERATING A SAWTOOTH-SHAPED CURRENT THROUGH A COIL BY COMPENSATING FOR DEFLECTION COIL RESISTANCE

[75] Inventor: Peter Ketelaar, Emmasingel, Eindhoven, Netherlands

[73] Assignee: U.S. Philips Corporation, New York, N.Y.

[22] Filed: Feb. 12, 1973

[21] Appl. No.: 332,010

[30] Foreign Application Priority Data

Feb. 19, 1972 Netherlands .................... 7202214

[52] U.S. Cl. ........................ 315/27 GD, 315/27 TD

[51] Int. Cl. .......................................... H01j 29/70

[58] Field of Search ...... 315/27 TD, 27 GD, 28, 29, 315/26, 27 R

[56] References Cited

UNITED STATES PATENTS

| | | | |
|---|---|---|---|
| 3,571,653 | 3/1971 | Hansen | 315/27 GD |
| 3,648,099 | 3/1972 | Otten | 315/27 GD |
| 3,697,801 | 10/1972 | Eulenberg | 315/27 TD |

*Primary Examiner*—Maynard R. Wilbur
*Assistant Examiner*—J. M. Potenza
*Attorney, Agent, or Firm*—Frank R. Trifari; Henry I. Steckler

[57] ABSTRACT

A deflection circuit in which a switching element, for example, a thyristor is driven during the flyback period. During the scan a diode automatically becomes conducting so that a constant direct voltage is applied to the deflection coil. An additional source which may be for example a transistor is included between the direct voltage source and the diode, thus enabling the linearity to be improved and/or the East-West correction to be achieved. In a picture display apparatus having an index tube the source may be the output of a control circuit for stabilizing the index frequency.

10 Claims, 4 Drawing Figures

CIRCUIT FOR GENERATING A SAWTOOTH-SHAPED CURRENT THROUGH A COIL BY COMPENSATING FOR DEFLECTION COIL RESISTANCE

The invention relates to a circuit for generating a sawtooth-shaped current through a coil, comprising a direct voltage source, a capacitor which during the scan of the sawtooth-shaped current is charged via a supply impedance by a charging current coming from a voltage source, a transformer having secondary winding to which the coil is coupled and a primary winding which is connected in series with a switching element and a diode which is connected to the voltage sourse, the switching element being released by means of a control signal during the flyback of the sawtooth-shaped current, so that the capacitor discharges via the primary winding, and the diode being automatically maintained in the conducting state during the scan period.

A circuit of this kind has been described in French patent specification No. 1,336,912. In this circuit the electrical energy stored in the capacitor during the scan is converted into magnetic energy, the circulation of energy causing the diode to conduct automatically during the scan. As a result a direct voltage, that from the source, is present across the coil, so that the current through the coil is sawtooth-shaped and, in principle, linear.

In a practical line deflection circuit of a video display apparatus a capacitor should be connected in series with the coil forming the deflection coil. This capacitor blocks an undesired dc component and also provides for the so-called S-correction. Another correction of the shape of the sawtooth-shaped line deflection current is necessary, i.e. the linearity correction. The deflection coil has an appreciable ohmic resistance which adversely affects the linearity of the deflection current.

A known step to achieve this is to connect a coil whose self-inductance depends on the current through it in series with the deflection coil. However, the correction thus obtained is not linear and even gives rise to other, albeit smaller, deviations. Moreover, the extra coil increases the impedance of the dc source, so that parasitic oscillations may arise in the deflection current. The object of the invention is to provide a linearity correction which meets strict requirements and to this end the circuit according to the invention is characterized in that a source having a low ohmic internal impedance and supplying a variable voltage during the entire scan period is included between the diode and the direct voltage source.

Due to the step according to the invention corrections other than the linearity correction of the sawtooth-shaped current may also be effected, for example, the so-called East-West correction. It also enables the width of the displayed image to be adjusted in a simple manner. Moreover, in a picture display apparatus comprising a so-called index colour tube, the aforementioned corrections and adjustments can be effect automatically.

Figure 1:
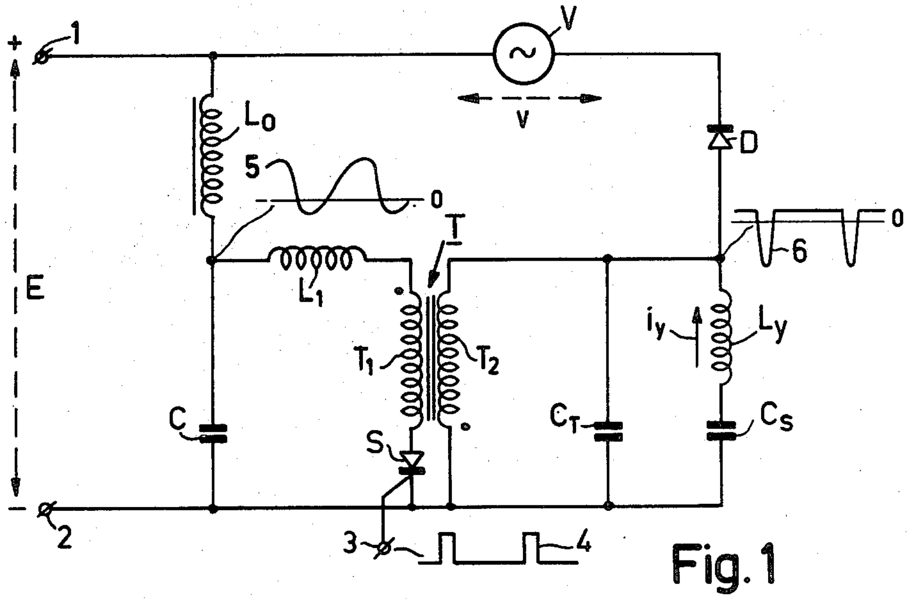
Figure 2:
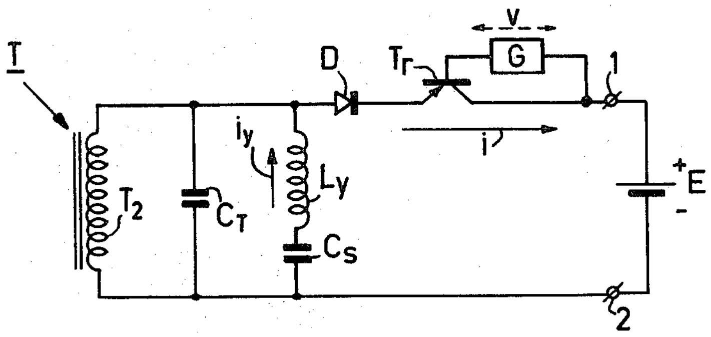
Figure 3:
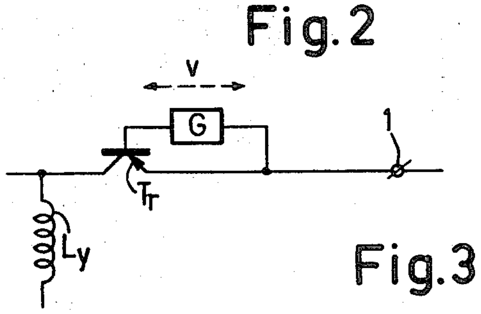
Figure 4:
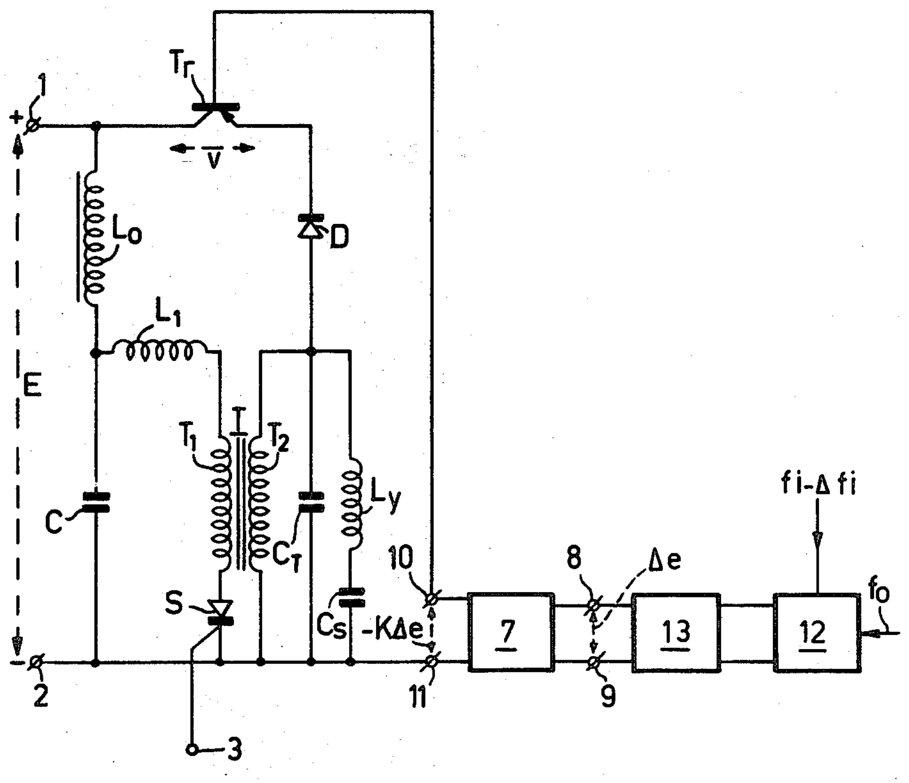

Embodiments of the invention are described by way of example with reference to the accompanying Figures, in which FIGS. 1, 2 and 3 show embodiments of the circuit according to the invention, and FIG. 4 shows the principle circuit diagram of a part of a video display apparatus having an index tube.

In FIG. 1 the circuit according to the invention includes a dc source producing a supply voltage of E volts between a positive terminal 1 and a negative terminal 2. The circuit furthermore comprises a supply coil $L_o$ and a capacitor C which are connected in series between terminals 1 and 2.

The series connection of an overswing coil $L_1$, the primary winding $T_1$ of a transformer T and a thyristor S is included between the junction of coil $L_o$ and capacitor C and terminal 2, the cathode of thyristor S being connected to terminal 2 and its gate forming a terminal 3.

One end of the secondary winding $T_2$ of transformer T is connected to terminal 2 and the other end of said winding is connected to a coil $L_y$. Coil $L_y$ is the line deflection coil of a picture display apparatus, which is not further shown, and the other end of coil $L_y$ is connected to terminal 2 via the capacitor $C_s$ for the S-correction. Another capacitor $C_T$ is connected across the winding $T_2$. Both windings of transformer T have been wound and connected in such a manner that the voltage present on the junction of winding $T_2$, capacitor $C_T$ and coil $L_y$ is stepped up and would be of opposite polarity with respect to the voltage on the junction of coil $L_1$ and winding $T_1$ in the absence of other elements. Finally, the former junction is connected to terminal 1 via a diode D and a source V, the anode of diode D being connected to said junction.

At the beginning of the line flyback period terminal 3 receives positive going pulses 4, so that thyristor S is conducting. During the line scan period thyristor S, which functions as a switch, is cut off so that capacitor C is charged by a current coming from voltage source E and flowing through supply coil $L_o$. During the flyback period capacitor C discharges via coil $L_1$, winding $T_1$ and thyristor S. Elements C, $L_1$, T, $C_T$, $L_y$ and $C_s$ have been selected so that they have a parallel resonant frequency whose period is approximately twice the line flyback time. The voltage across capacitor C consequently varies in an approximately cosine-shaped fashion and becomes negative, so that thyristor S is cut off. Simultaneously a negative going pulsatory voltage develops across winding $T_2$. Both voltages are shown in FIG. 1 by the reference numerals 5 and 6, respectively.

At the instant when voltage 5 has reached approximately the value $-(E/n)$, diode D becomes conducting, $n$ being the ratio between the number of turns of winding $T_2$ and that of winding $T_1$, and V being left out of consideration for the time being. The circuit should be proportioned so that said instant coincides with the beginning of the scan time. During this time the voltage 6 substantially retains the value E so that the desired sawtooth-shaped current $i_y$ will flow through deflection coil $L_y$ and will return to source E. In fact, the voltage across diode D and its variations are negligibly small relative to the voltage E (some tenths of a volt with respect to, for example, 150 V). Overswing coil $L_1$, which may be constituted by the leakage inductance of transformer T, and capacitor $C_T$ ensure that sudden transients cannot occur in thyristor S and in diode D which are both semiconductor elements. This has already been explained in more detail in said patent specification.

According to the invention a source V supplying a voltage $v$ has been included between D and source E, so that the voltage present across winding $T_2$ during the scan period equals E + v. The voltage $v$ is adjusted so that the voltage drip $i_y r$ across the ohmic component $r$ of the impedance of deflection coil $L_y$ is compensated for. Consequently, voltage $v$ is the sum of a constant direct voltage and of a linear sawtooth-shaped voltage. By adjusting this direct voltage the amplitude of deflection current $i_y$ and thus the width of the displayed image can be adjusted in a simple manner, whereas adjusting the sawtooth-shaped voltage affects the linearity of the line deflection. As the deflection current $i_y$ has been S-corrected by means of capacitor $C_s$, voltage $v$ should, in fact, also contain a component which is a third-order function of time. Source V may alternatively be used for the so-called East-West correction: for this purpose the voltage $v$ should contain a component of field frequency. If the raster distortion to be corrected is pin cushion-shaped, this component will have to be substantially parabolic with a maximum halfway the field scan period, whilst the sawtooth-shaped component can be modulated by a similar signal of field frequency. A condition for the proper operation of the circuit arrangement according to FIG. 1 is that the internal impedance of source V has a low ohmic component and that diode D constantly remains conducting during the scan period.

Source V may have the embodiment as shown in FIG. 2, in which for simplicity only the secondary circuit of transformer T has been drawn. A transistor Tr of the pnp type has been connected between diode D and source E, the emitter being connected to the cathode of diode D and the collector to terminal 1. Voltage $v$ between the base of transistor Tr and terminal 1 is produced by a generator G of a known type. Thus, a voltage equal to $v$ will be present between the emitter and the collector of transistor Tr because the voltage difference between the base and the emitter is negligibly small. The bias means (not shown) of the base of transistor Tr should be such that transistor Tr can conduct during each scan. For the current i, which is sum of current $i_y$ and the current flowing through winding $T_2$, transistor Tr indeed has a very low impedance, this is the impedance "seen" by its emitter.

It may be noted that diode D and the emitter-base diode of transistor Tr are connected in series and in the same conductivity direction so that diode D can be omitted, provided that the transistor can withstand the inverse voltage surge occurring between the emitter and base during the fly-back period.

FIG. 3 shows a modification in which diode D is also omitted. Transistor Tr is now of a type in which in the cut-off condition a large inverse base collector current can flow. The collector and the emitter of transistor Tr in FIG. 3 have been interchanged compared with FIG. 2. The function of diode D has been taken over by the base collector diode of the transistor. A requirement for this is that voltage $v$ cannot exceed the maximum permissible inverse voltage between the base and the emitter, this is generally 5 to 7 V. Such a transistor is, for example, the Philips type BU 108. However, this transistor is of the npn type, so that voltage E should be negative on terminal 1. In the case of FIG. 3 generator G should have a low ohmic impedance.

Source V may be alternatively constituted by a transformer whose secondary winding is connected between diode D and terminal 1, generator G being connected to the primary winding. Generator G should have a low ohmic internal resistance, which can be achieved, for example, by means of an emitter follower. Ohmic losses, if any, of the transformer should also be compensated for by generator G. Alternatively, a transductor may be employed whose power winding is included between the diode and terminal 1 and whose control winding receives the relevant signals of line and field frequency. In the latter case source V has an inductive internal impedance, which cannot interfere with the operation of the circuit.

Transformer T in FIG. 1 may alternatively be used to produce stabilised supply voltages. The amplitude of the pulses during the flyback period of voltage 6 is little dependent on the adjustment of voltage $v$. The pulses developing across further secondary windings of transformer T are then rectified with the desired polarity and the desired amplitude during said period.

One of these voltages may be the EHT for the final anode of the picture display tube. An advantage of such an EHT generator is that it has a relatively low internal impedance. This may be clarified as follows. If, for example, the brightness on the display screen increases, i.e. if the beam current in the display tube increases, the load to the generator increases. The intensity of the current through the EHT winding (not shown in FIG. 1) increases. This implies that capacitor C is further discharged, which means that voltage 5 becomes more negative at the end of the flyback period. However, as the mean voltage across capacitor C should remain equal to E (for capacitor C is charged via a self inductance), this implies that voltage 5 increases at the end of the scan period. The flyback pulse across winding $T_1$ consequently becomes higher and that across the EHT winding becomes more flattened. The conduction angle of the EHT rectifier then increases so that the high voltage will decrease only slightly. It will be evident that the internal impedance of the high EHT voltage generator may be still further reduced by tuning its leakage inductance in the usual manner. A similar tuning is described in United States Patent Specification No. 3,500,116.

The described circuit arrangement may be used for the horizontal deflection in a video display tube of any type. The improved embodiment of FIG. 4 may be used for the so-called index tube in which the horizontal linearity must be very good.

In a display apparatus equipped with an index tube the line deflection should be corrected in such a way that the index frequency is maintained constant as much as possible. The deflection and the received synchronizing signals might be compared, for example in a phase discriminator in order to control the line time base. However, since the voltage across the line deflection coil generally varies little during the scan period and because high self inductance values are involved, such a control system would be extremely inert. In FIG. 4 voltage $v$ is influenced, which can be effected with a much smaller inertia, so that the index frequency can be corrected in less than one line period. In FIG. 4 reference numeral 7 respresents an amplifier which receives a control voltage $\Delta e$ between its input terminals 8 and 9, whilst an amplified control voltage $-K \Delta e$ is present between its output terminals 10 and 11, K being the gain factor of amplifier 7. Voltage $-K \Delta e$ is the accomponent which is applied to the base of the transistor. The direct voltage present between terminals 10 and 11 should be such that the end of winding $T_2$ not connected to terminal 2 carries the required potential $E + v$.

The deflection is detected in a known manner, for example, by means of a photo-sensitive element, and converted into electrical signals. A frequency demodulator 12 compares the nominal index frequency $f_o$ with the instantaneous value of the index frequency thus obtained and converts the variations of the difference into voltage variations. The output voltage of demodulator 12 is fed to the input terminals 8 and 9 of amplifier 7 via a low-pass filter 13. Filter 13 reduces noise and interference. If voltage $\Delta e$ is of the correct polarity the described control circuit counteracts the linearity deviations and reduces variations of the index frequency, the index for frequency is proportional to the time derivative of the deflection current and consequently to voltage $E + v$, depending on the location of the electron beam on the display screen. Hence, feedback between the deflection generator and modulator 12 is possible.

Without the control circuit the index frequency would be $f_i$. With the control circuit it is $f_i - \Delta f_i$. The demodulator 12 supplies no voltage if $f_i - \Delta f_i$ equals the frequency $f_o$ and its sensitivity is $k = (\Delta e / \Delta f)$. The sensitivity of the deflection generator is $$k_y = -[\Delta (di_y/dt)/\Delta E] = (1/L_y),$$

whilst the transfer function of filter 13 is $k_F$ and equals 1 for low frequencies. The display tube (not shown in FIG. 4), the photosensitive element and the index processing stage have a transfer function $k_i = -[\Delta f / \Delta (di_y/dt)]$ which depends on the location of the beam on the display screen.

With these notations the frequency difference caused by the negative feedback equals.

$$f_i = k k_F K k_y k_i (f_i - \Delta f_i - f_o)$$

so that the frequency deviation is reduced by a factor $$s = [(f_i - \Delta f_i - f_o)/(f_i - f_o)] = (1/1 + G)$$

in which $G = k k_F K k_y k_i =$ the open-loop transfer function. When $k_F = 1$ (static case) the reduction factor $s_o = 1/1 + G_o$, in which $G_o$ is the static open-loop gain.

In a practical case with a 21 inch index tube and a deflection angle of 90° it has been found that:

$k = 10^{-6}$ V.s $K = 30$ $k_y = 3.3 \cdot 10^2$ A.V$^{-1}$.s$^{-1}$ ($L_y = 3.3$ mH)

$k_1 = 300$ A$^{-1}$ so that $G_o = 3$ and the reduction factor $s_o = 1/4$, which was proved by measurements.

If the line pattern on the display screen is such that an undistorted picture corresponds to a constant index frequency the control loop according to FIG. 4 provides an automatic correction of geometrical distortions in the horizontal direction of the displayed image: linearity, East-West correction, deviations caused by an imperfect S-correction. Moreover, the picture width is automatically kept constant.

In the case that source V does not employ a transistor but a transformer, the primary winding of this transformer will be connected to terminals 10 and 11, whilst the secondary winding will be connected between terminal 1 and diode D. A requirement for this is that the output impedance of amplifier 7 has a low ohmic component. Terminals 10 and 11 thus form the terminals of source V in FIG. 1. This circuit has the advantage that no problems will occur as regards the dc levels. However, the dc component of the correction voltage is then not transferred.

What is claimed is:

1. A circuit for supplying a sawtooth current having scan and flyback periods to a coil having resistance from a direct voltage first voltage source, said circuit comprising a capacitor having terminal means for coupling said capacitor to said source; a transformer having a primary and a secondary means for coupling to said coil; a switching means having control input means for receiving a turn on control signal during said flyback period and a pair of conduction terminals; means for series coupling together said conduction terminals, said primary, and said capacitor; and means for compensating for said coil resistance comprising a unidirectional conducting means coupled to said secondary for conduction during said scan period and a low impedance variable second voltage source having a first terminal coupled to said unidirectional means and a second terminal means for coupling to said first voltage source.

2. A circuit as claimed in claim 1 wherein the variable voltage during the line scan period is sawtooth-shaped.

3. A circuit as claimed in claim 1 wherein the variable voltage contains a parabola-shaped component of field frequency.

4. A circuit as claimed in claim 1 wherein the sawtooth current is amplitude-modulated with field frequency, the envelope being parabola shaped.

5. A circuit as claimed in claim 1 wherein the source comprises a transistor having an emitter connected to the unidirectional means and a collector connected to the direct voltage source and whose emitterbase diode has the same conductivity direction as the unidirectional means.

6. A circuit as claimed in claim 5, characterized in that the variable voltage is applied between the base and the collector of the transistor.

7. A circuit as claimed in claim 1 wherein the second source comprises a transistor whose collector-base diode is the unidirectional means and whose emitter is connected to the direct voltage source, the variable voltage being applied between the base and the emitter of the transistor.

8. A circuit as claimed in claim 1 wherein the second source comprises a transformer having a secondary winding included between the unidirectional means and the direct voltage source.

9. A circuit as claimed in claim 1 wherein the second source comprises a transductor having a power winding included between the unidirectional means and the direct voltage source.

10. Picture display apparatus comprising a circuit as claimed in claim 1 in which the coil is a deflection coil for deflecting an electron beam in a picture display tube belonging to the apparatus, the picture display tube being of the index type, wherein the circuit further comprises a control circuit means for reducing deviations of the index frequency, the output terminals of the control circuit comprising the second source.

* * * * *